United States Patent [19]
Fukumoto

[11] Patent Number: 5,944,937
[45] Date of Patent: Aug. 31, 1999

[54] CHEMICALLY RESISTANT SHEET AND METHOD FOR MAKING

[75] Inventor: Masafumi Fukumoto, Amagasaki, Japan

[73] Assignee: Nisshin Chemical Industry Co. Ltd., Hyogo, Japan

[21] Appl. No.: 08/872,231

[22] Filed: Jun. 10, 1997

Related U.S. Application Data

[60] Continuation of application No. 08/603,208, Feb. 20, 1996, abandoned, which is a division of application No. 08/437,668, Apr. 25, 1995, abandoned.

[51] Int. Cl.$^6$ .................................................. B32B 31/20
[52] U.S. Cl. ...................... 156/309.6; 156/324; 428/422
[58] Field of Search ............................ 156/308.2, 309.3, 156/309.6, 324; 428/421, 422

[56] References Cited

U.S. PATENT DOCUMENTS

| | | | |
|---|---|---|---|
| 3,767,500 | 10/1973 | Tally | 156/324 |
| 3,769,137 | 10/1973 | Moriyama | 156/309.3 |
| 4,749,610 | 6/1988 | Katsuragawa | 428/421 |
| 4,943,473 | 7/1990 | Sahatjian | 428/245 |
| 5,141,800 | 8/1992 | Effenberger | 428/422 |

OTHER PUBLICATIONS

Webster's II New Riverside University Dictionary, Houghton Mifflin Company, 1984, p. 1156.

*Primary Examiner*—Daniel Stemmer
*Attorney, Agent, or Firm*—Schweitzer Cornman, Gross & Bondell LLP

[57] ABSTRACT

A chemically resistant composite sheet composed of a PTFE substrate layer, a glass cloth, and an intermediate thermoplastic fluoropolymer layer of a thermoplastic fluorocarbon resin prepared by laminating the layers between a pair of rollers under pressure and under heat sufficient to melt the intermediate thermoplastic flruopolymer.

2 Claims, 2 Drawing Sheets

CHEMICALLY RESISTANT SHEET AND METHOD FOR MAKING

This is a continuation of which patent application Ser. No. 08/603,208, filed on Feb. 20, 1996, now abandoned which is a divisional application for U.S. Letters Patent Ser. No. 08/437,668, filed on Apr. 25, 1995 now abandoned.

FIELD OF THE INVENTION

The present invention relates to a chemically resistant sheet for use as a protective lining of reactors, reaction towers, reservoirs, tanks, or containers for transportation and storage of any liquid, or various containers for chemicals or electronic parts, and to a method of making such a sheet.

BACKGROUND OF THE INVENTION

Fluoropolymers are highly chemically and heat resistant, non-sticky materials with excellent electrical properties. They are widely used such as in the chemical industry, petroleum industry, production of paints, inks or other chemicals, pharmaceuticals, and semiconductors. Polytetrafluorethylene (PTFE) which is widely used is a less expensive but superior variety of fluoropolymer in chemical resistance.

PTFE has poor surface adhesibility and cannot be adhered to metal and other materials by conventional techniques. PTFE cannot be melted to flow so that the so-called "loose lining" method has to be employed when using it for the lining the interiors of towers, reservoirs or tanks. Such a "loose-lined" PTFE sheet merely intervenes between the inner surface of a storage vessel and a stored material within the vessel. Therefore, it is a drawback of PTFE lining sheets that they cannot be attached with adhesives to firmly secure them to such interior surfaces.

SUMMARY OF THE INVENTION

An object of the present invention is to provide a chemically resistant multilayer sheet of a PTFE layer and other layers, which can be adhered to inner wall surfaces of a tank or the like container when provided with a lining. The composite PTFE sheet of the present invention must be resistant to delamination and be easily bent or otherwise processed, while enabling an easy and continuous manufacture of an elongate sheet of such improved properties.

Accordingly, the chemically resistant sheet of the present invention comprises a PTFE substrate, a fiber glass fabric and an intermediate layer of a thermoplastic fluorocarbon resin, as an integrated laminate. This laminate can be adhered by means of its fiber glass fabric surface with a conventional adhesive to the interior surface of a tank or the like container. The PTFE substrate surface of the composite liner of the present invention affords to this laminate satisfactory resistance to chemicals and heat, good electrical properties, and presents a nonadhering surface. The intermediate layer integrates the PTFE substrate and the glass cloth into the stable laminate of the present invention so that no delamination would occur even when the laminate is suddenly and strongly bent or is otherwise distorted. It is a further advantage that the laminate can be produced in an easy and inexpensive manner.

In the laminate of the present invention, the intermediate layer is prepared as a thermoplastic fluorocarbon resin film, and is interposed between the PTFE substrate layer and the fiber glass fabric to form a composite web which is heated to a temperature higher than the melting point of the intermediate film, before finally cooling it thus to integrate the substrate and the cloth into the laminate. Therefore, a simple apparatus can be easily employed to produce the elongate, chemically resistant sheet inexpensively in a continuous process.

BRIEF DESCRIPTION OF THE DRAWING

The present invention is described in detail, with reference being had to the drawing, wherein.

DETAILED DESCRIPTION

Figure 1:
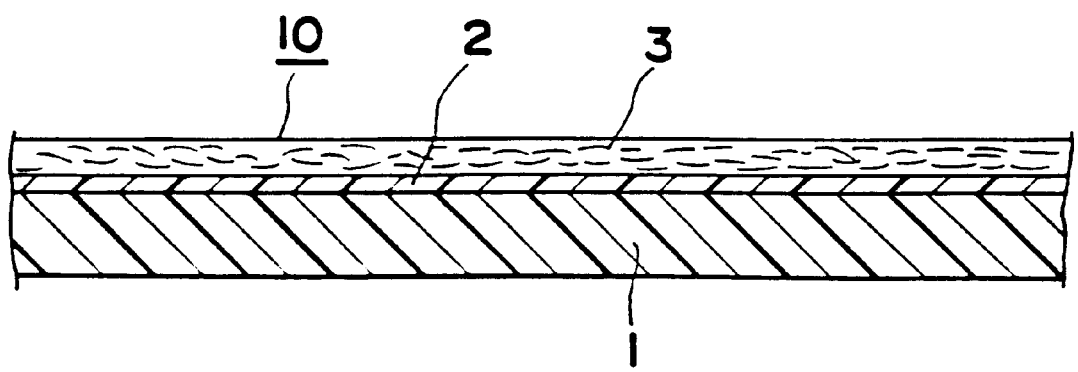
FIG. 1 is a cross-sectional view of a chemically resistant sheet of the present invention.

A chemically resistant sheet 10 of the present invention is shown in FIG. 1 as a laminate of a PTFE substrate 1 laminated to a fiber glass fabric or cloth 3, by an intermediate layer 2 of a thermoplastic fluorocarbon resin. Any conventional adhesive can be used to firmly secure the outer surface of the glass cloth 3 of the laminated sheet 10 to the inner surface of a tank or the container to provide it with an adhered lining. The PTFE substrate 1 provides to the laminate 10 a satisfactory resistance to chemicals and heat, and non-stickiness and good electrical properties in the same manner as would any conventional PTFE lining. The fluorocarbon resin forming the intermediate layer 2 is molten under pressure and then is cooled again in the process of producing the laminate 10. Portions of the intermediate layer are thus pressed into and retained between the fibers of the glass cloth 3, so that the intermediate layer 2 is anchored to the fabric through the portions retained in the fabric. Due to the compatibility between the PTFE of the substrate 1 and the thermoplastic fluorocarbon resin that forms the intermediate layer 2, the latter adheres well to the PTFE substrate to become integral therewith. Consequently, these strata build a composite but tenacious structure free from any tendency of delamination.

It would be impractical to hot press the PTFE substrate 1 directly against the fiber glass cloth 3, then an extremely high pressure would have to be used on a wide press. Since PTFE has a high melt viscosity and poor flow characteristics, these would not allow portions or parts thereof to be forced in and between the fibers of the glass cloth 3 to a sufficient extent. Therefore, such a hypothetical double-layer laminate would show poor resistance to delamination so that the layers would readily be separated from each other by hand. In another hypothetical case in which the substrate 1 is formed from a conventional fluorocarbon resin rather than PTFE, a low pressure hot press would be sufficient to produce a strong resistance to delamination. However, the resultant laminate in that case will have inferior chemical resistance and other properties compared to the composite including a PTFE substrate. Further such a laminate that does not include a PTFE substrate would have a markedly higher material cost and would be so stiff that it would have limited utility.

The fluorocarbon resin of the intermediate layer 2 in the chemically resistant composite 10 of the present invention does not require any special composition, and can be suitably a fluorocarbon resin such as: a copolymer of $CF_2=CF_2$ and $CF_2=CF-CF_3$ sold under the trademark Teflon FEP by E.I. Dupont de Nemours & Co. (DuPont); a copolymer of $CF_2=CF_2$ and $CF_2=CF-O-Rf$ where Rf is a perfluoroalkyl group, sold under the trademark Teflon PFA by DuPont; a terpolymer of $CF_2=CF_2$, $CF_2=CF-CF_3$ and $CF_2=CF-O-RF$ sold under the trademark Teflon EPE by DuPont; a copolymer of $CH_2=CH_2$ and $CF_2=CF_2$ sold under the trademarks Teflon ETFE by DuPont, and Tefzel by Mitsui DuPont Fluorochemicals; a homopolymer of $CH_2=CF_2$ i.e. polyvinylidene fluoride, sold under the trademarks Teflon PVDF by DuPont, and Keiner by Pennwalt; a copolymer of $CH_2=CH_2$ and $CF_2=CF-CF_3$ sold under the trademark Teflon ECTFE by DuPont; and a homopolymer of $CHF=CH_2$ sold under the trademark Teflon PVF by DuPont.

Figure 2:
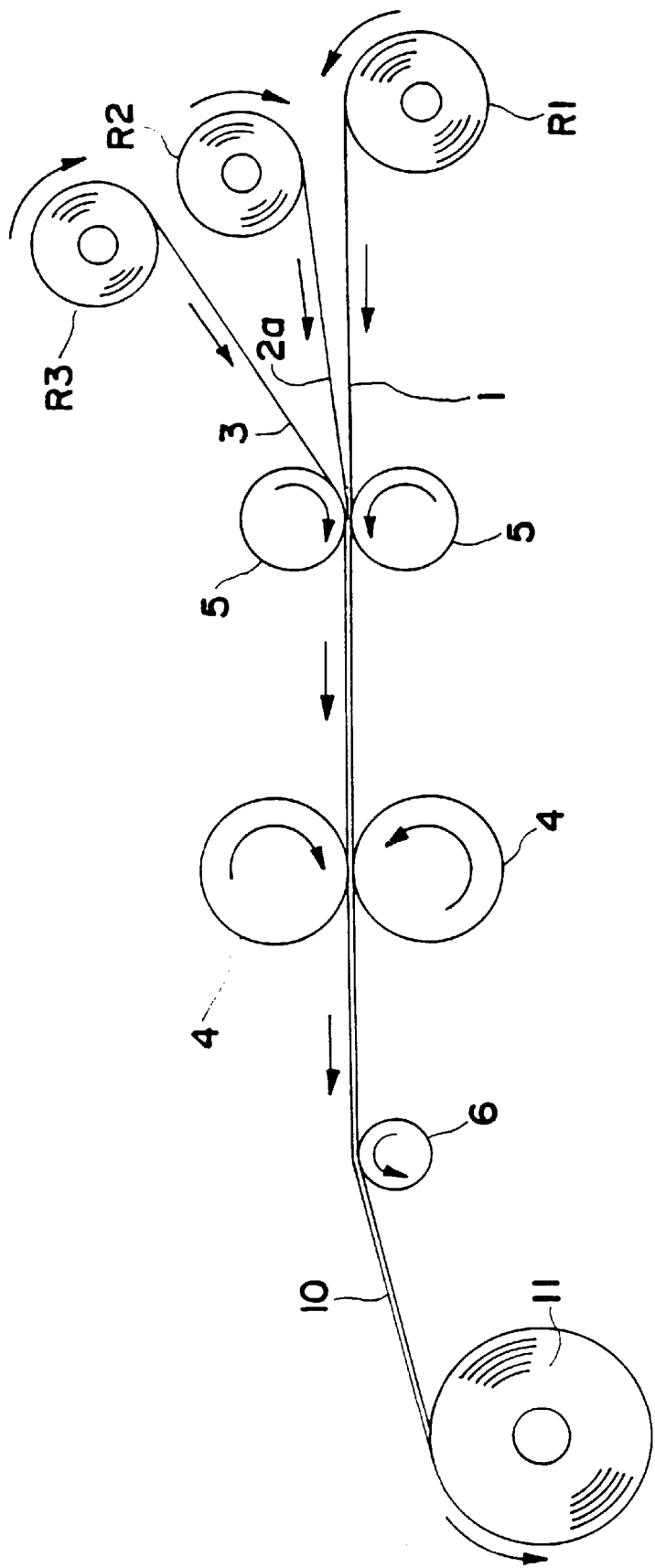
FIG. 2 is a schematic showing of a continuous process for producing the chemically resistant sheet of FIG. 1.

The chemically resistant sheet 10 of the present invention is produced by continuously feeding a fluorocarbon resin film 2a between the PTFE substrate 1 and the glass cloth 3 webbings. When these webbings are overlaid one another they are continuously hot pressed at a temperature higher than the melting point of the fluorocarbon resin film 2a so that an integral laminate is obtained. Suitably all of the substrate 1, the fluorocarbon film 2a, and the glass cloth 3 are elongated and substantially endless webbings. As shown in FIG. 2, those starting materials are suitably continuously unwound and delivered from supply reels R1, R2 and R3, respectively, to come into close contact with each other to form a composite multilayer web when compressed by a pair of hot press rolls 4, 4, suitably at a pressure of from about 1 to about 5 $kg/cm^2$. The resulting continuous laminate 10 is wound continuously onto a takeup roll 11. Guide rolls 5, 5 and 6 enable smooth flow at the webbing and the continuous operation of the system.

The chemically resistant laminate 10 can be cut into a size corresponding exactly to the dimension of any surface that has to be covered with a lining without producing any noticeable amount of waste in contrast with the known batch-produced separate sheets at excessive sizes.

While it would be theoretically possible to employ a hot melt application system for introducing the fluorocarbon resin between the substrate and the glass fabric to form the intermediate layer PTFE it is only theoretically so, because as a practical matter it is out of the question. This is because that requires a complicated and expensive apparatus, and the applied thickness as and the melt viscosity of the fluorocarbon would be difficult to control accurately. Moreover, a superfluous, excessive amount of molten resin would be consumed thus further increasing production costs, due to an excessive transfer of material into the fine texture of glass cloth. In that case a considerable amount of the molten fluorocarbon resin which would permeate through the glass cloth to its opposite, free surface would impair its adhesiveness.

In accordance with the present invention the PTFE substrate I is suitably from about 0.1 to about 5 mm thick, the thermoplastic fluorocarbon resin film 2a is suitably from about 0.05 to about 0.3 mm thick, and the weight per unit area of the glass cloth is suitably from about 100 to about 800 $g/m^2$/.

The invention is further described by the following illustrative examples.

EXAMPLE 1

A PTFE- sheet of a thickness of 0.4 mm was laminated to a film of Teflon FEP having a thickness of 0.1 mm, and a glass cloth having a weight per unit area of 440 $g/m^2$. These webbings were unrolled from supply reels of identical width and the Teflon FEP film was sandwiched between the laminated PTFB sheet below and the glass cloth above it, thereby to prepare the composite webbing in a continuous manner. This webbing advances at a speed of 0.3 m/min and was then nipped between a pair of hot rolls at a pressure of 3 kg/cm and at a temperature of 380 ° C. The resultant chemically resistant laminate was subjected to a test to measure its resistance to delamination per width of 35 mm which confirmed that the sheet had a resistance of 3.5 kg or better to delamination.

EXAMPLE 2

Another film of Teflon PFA was used in place of the Teflon FEP of Example 1, with the other conditions being unaltered. the resistance to delamination per width of 35 mm of the resultant chemically resistant sheet was 5 or better.

I claim:

1. A method for preparing a protective laminate on a rigid substrate surface to be protected thereby, the laminate comprising a chemically resistant sheet of a PTFE substrate layer having a thickness of from about 0.1 mm to about 5 mm, a substrate adhesion enabling fiberglass fabric layer having a weight per unit area of from about 100 $g/m_2$ to about 800 $g/m^2$, and an adhesive layer of thermoplastic fluorocarbon polymer between the PTFE substrate layer and the substrate adhesion enabling fiberglass layer, said polymer having a layer thickness of from 0.05 mm to about 0.3 mm, all compressed into an integrated laminate, which comprises introducing the PTFE substrate layer and the substrate adhesion enabling fiberglass fabric layer with the thermoplastic fluorocarbon polymer layer therebetween to form a composite layer, and hot pressing said composite layer at a temperature above the melting point of the thermoplastic fluorocarbon polymer to form an integrated laminate cover, and attaching said integrated laminate cover to said rigid substrate.

2. A method for preparing a protective laminate for attachment to a surface to be protected thereby, the laminate comprising a chemically resistant sheet of a PTFE substrate layer, a substrate adhesion enabling fiberglass fabric layer, and an adhesive layer of thermoplastic fluorocarbon polymer between the PTFE substrate layer and the substrate adhesion enabling fiberglass layer, all compressed into an integrated laminate, which comprises introducing the PTFE substrate layer and the substrate adhesion enabling fiberglass fabric layer with the thermoplastic fluorocarbon polymer layer therebetween to form a composite layer, and hot pressing said composite layer at a temperature above the melting point of the thermoplastic fluorocarbon polymer to form an integrated laminate, wherein the thickness of the PTFE layer is from about 0.1 to about 5 mm, the thermoplastic fluorocarbon polymer is from about 0.05 to about 0.3 mm thick, and the weight per unit area of the fiberglass fabric layer is from about 100 to about 800 $g/m^2$.

* * * * *